June 20, 1939.  W. J. ZENNER  2,163,302
KEYBOARD TRANSMITTER
Filed April 18, 1936  4 Sheets—Sheet 1

INVENTOR
WALTER J. ZENNER
BY
ATTORNEY

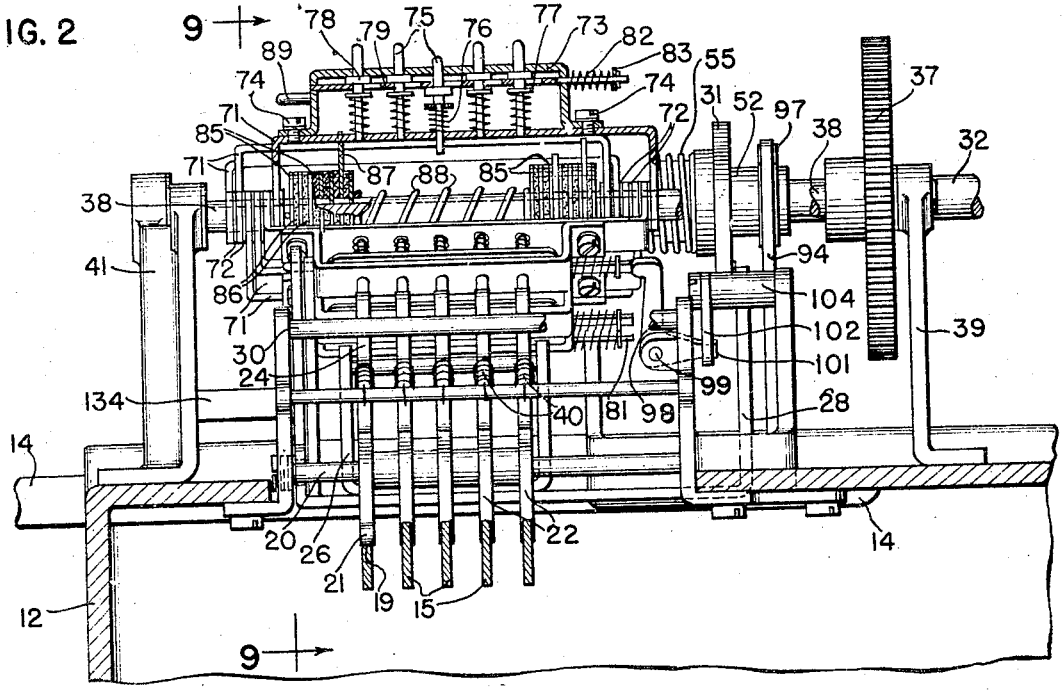
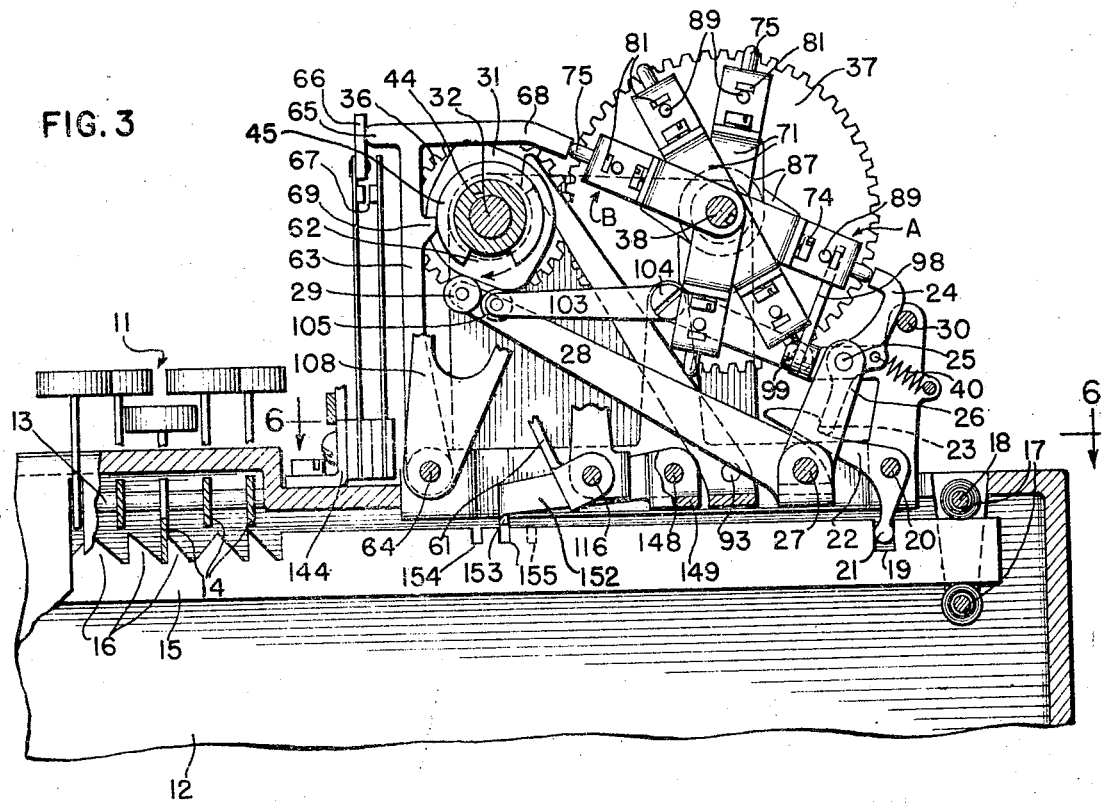

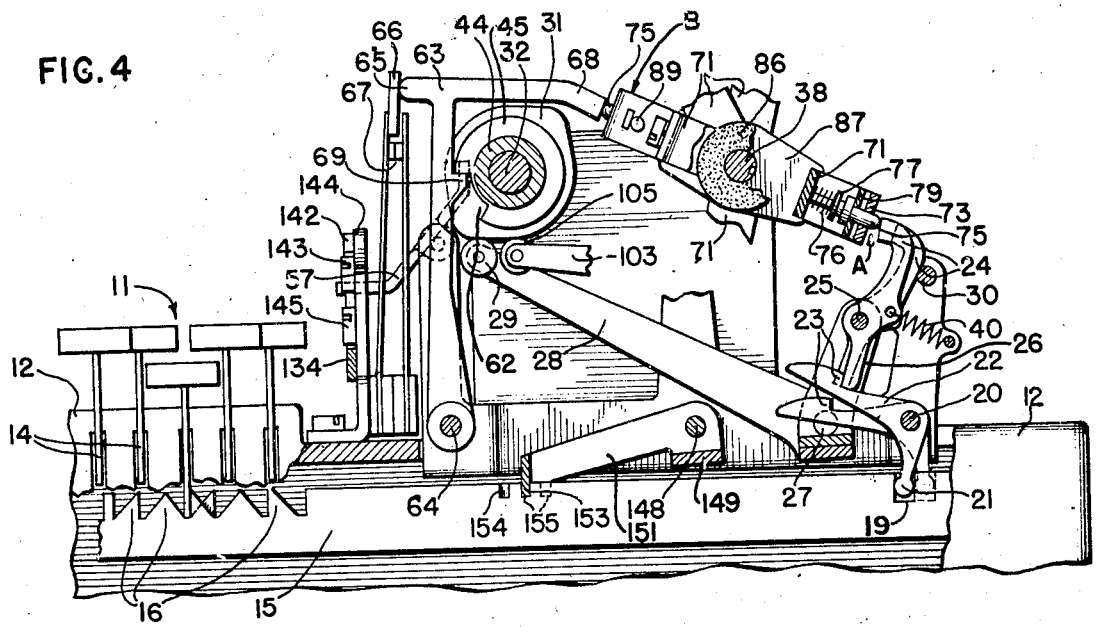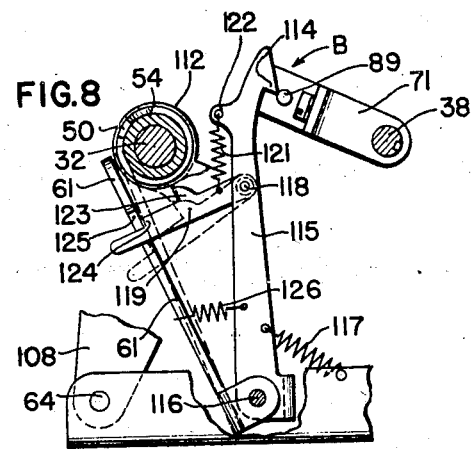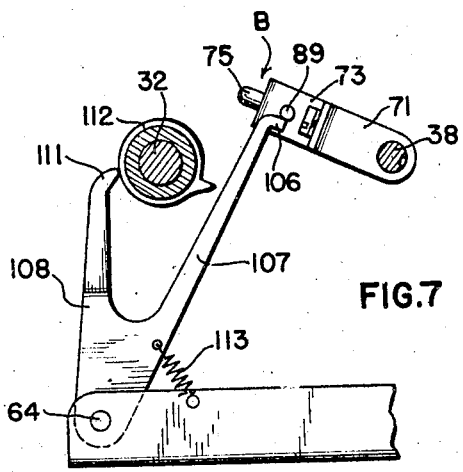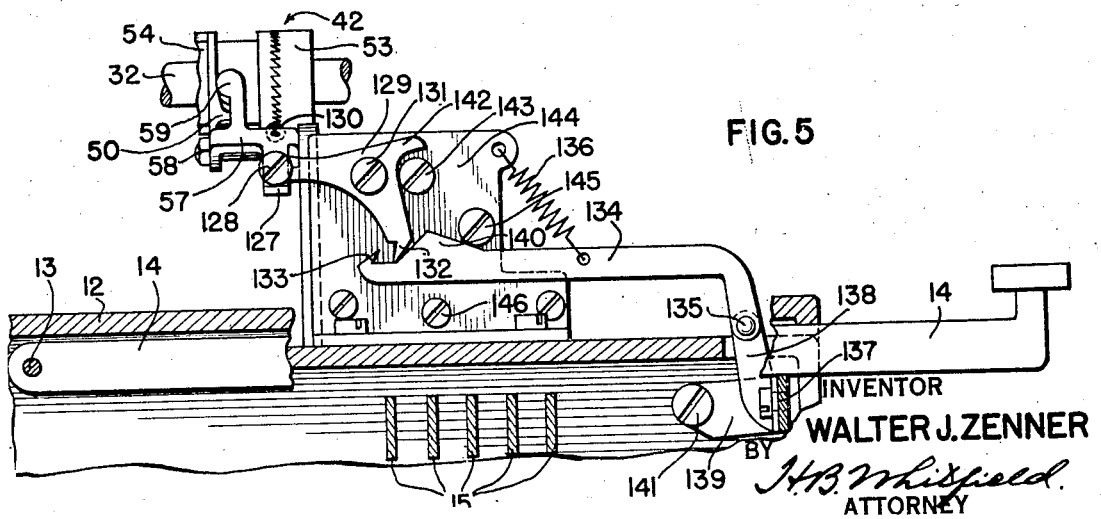

INVENTOR
WALTER J. ZENNER
BY
ATTORNEY

Patented June 20, 1939

2,163,302

UNITED STATES PATENT OFFICE 2,163,302

KEYBOARD TRANSMITTER

Walter J. Zenner, Des Plaines, Ill., assignor to Teletype Corporation, Chicago, Ill., a corporation of Delaware Application April 18, 1936, Serial No. 75,051

33 Claims. (Cl. 178—17.5)

The present invention relates to telegraph signaling apparatus and more particularly to telegraphic keyboard controlled storage transmitting devices.

Where keyboard apparatus has been employed for the initiation of telegraphic devices, an irregularity has been noted which even with experienced operators may be material. Such irregularity causes the transmission of signals at a relatively inefficient rate of operating speed which is true especially where the transmitting operator is handicapped by a lack of proficiency, under which circumstances the full capacity of the transmitting apparatus is not utilized. A corresponding inefficiency of the line time results as well as a diminution in the volume of subject matter communicated per unit of time. Again, where the transmitting operator has attained sufficient skill to be able to exceed the capacity of the transmitting apparatus, a corresponding inefficiency must be recognized due to the inability of the transmitting mechanism to transmit the signals at a corresponding rate of operation.

In order to utilize fully the skill of a trained operator and to maintain a high signaling efficiency, divers methods of transmission have been proposed based upon the provision of signal storage mediums used in conjunction with automatic transmitters. Most familiar is the use of code perforated tape which is fed intermittently through a record reader mechanism at a uniform rate of speed commensurate with the capacity of transmission. In such systems there is employed a keyboard tape perforating mechanism and a tape controlled signal transmitting mechanism. The provision of two complete mechanisms necessarily entails a certain amount of expense.

Accordingly, an object of the present invention is the provision of a simple, reliable and inexpensive keyboard mechanism which permits of operation at a speed exceeding the normal operating speed of the telegraph circuit with which it is connected.

In one arrangement contemplating the features of the present invention there is employed a conventional set of key levers comprising a standard telegraphic keyboard, a set of code bars to be permutably positioned in accordance with the operation of each key lever, and a distributor shaft which is cyclically operated under start-stop conditions of operation and during which a series of transmitting contacts are successively and selectively closed to permit current impulses to be transmitted over a signaling circuit. Between the keyboard mechanism and the transmitting contacts, there is provided a cylindrical cluster of bails each carrying a set of five spring loaded storage pins. The several bails are independently propelled by a frictional drive causing them to nest into groups, the foremost bail of one group being opposite a set of transmitting shaft elements whereat signals stored in said bails are communicated to said transmitting elements and the foremost bail of another group being opposite a series of storage code setting levers which receive their setting in turn from a corresponding series of code bars. Bails having passed the transmitting point, and served the purpose of supervising the issuance of a line signal, are then accumulated near a series of code setting levers which are controlled by the keyboard code mechanism. After having discharged a code signal, the bail storage pins are adapted to receive a succeeding signal and thereafter the bails are released so that each may be advanced in its turn to the transmitting mechanism. The number of storage elements herein contemplated is sufficient to accommodate several signals between the keyboard setting position and the signal transmitting position.

The utilization of the aforedescribed principle of operation maintains the transmitting speed constant and thus materially increases the efficiency of operation of the keyboard transmitter. Moreover, this general object is further promoted by a feature of the herein proposed embodiment, as a result of which the keyboard and transfer mechanism are enabled to perform their functions at a materially increased speed. It has been found that from this advantage a keyboard speed may be developed which is comparable to that of automatic telegraph transmitters.

For a comprehensive understanding of the principles underlying the present invention, reference should be had to the accompanying drawings and to the specification following wherein like characters designate corresponding parts throughout, and wherein, Fig. 1 is a plan view illustrating a keyboard controlled apparatus having portions broken away and having incorporated therein certain embodiments underlying the present invention;

Fig. 2 is a transverse sectional view taken approximately on line 2—2 of Fig. 1;

Fig. 3 is a transverse sectional view with parts broken away taken approximately on line 3—3 of Fig. 1;

Fig. 4 is a transverse sectional view taken in the same direction as Fig. 3 but having additional mechanism broken away to reveal posterior features of the distributing shaft and indicating an advanced position during a cycle of operation;

Fig. 5 is a transverse sectional detail view taken approximately on line 5—5 of Fig. 1 featuring the clutch release mechanism and universal bail therefor;

Fig. 7 is a transverse sectional detail view taken approximately on line 7—7 of Fig. 1;

Fig. 8 is a sectional detail view taken approximately on line 8—8 of Fig. 6.

Figure 1:
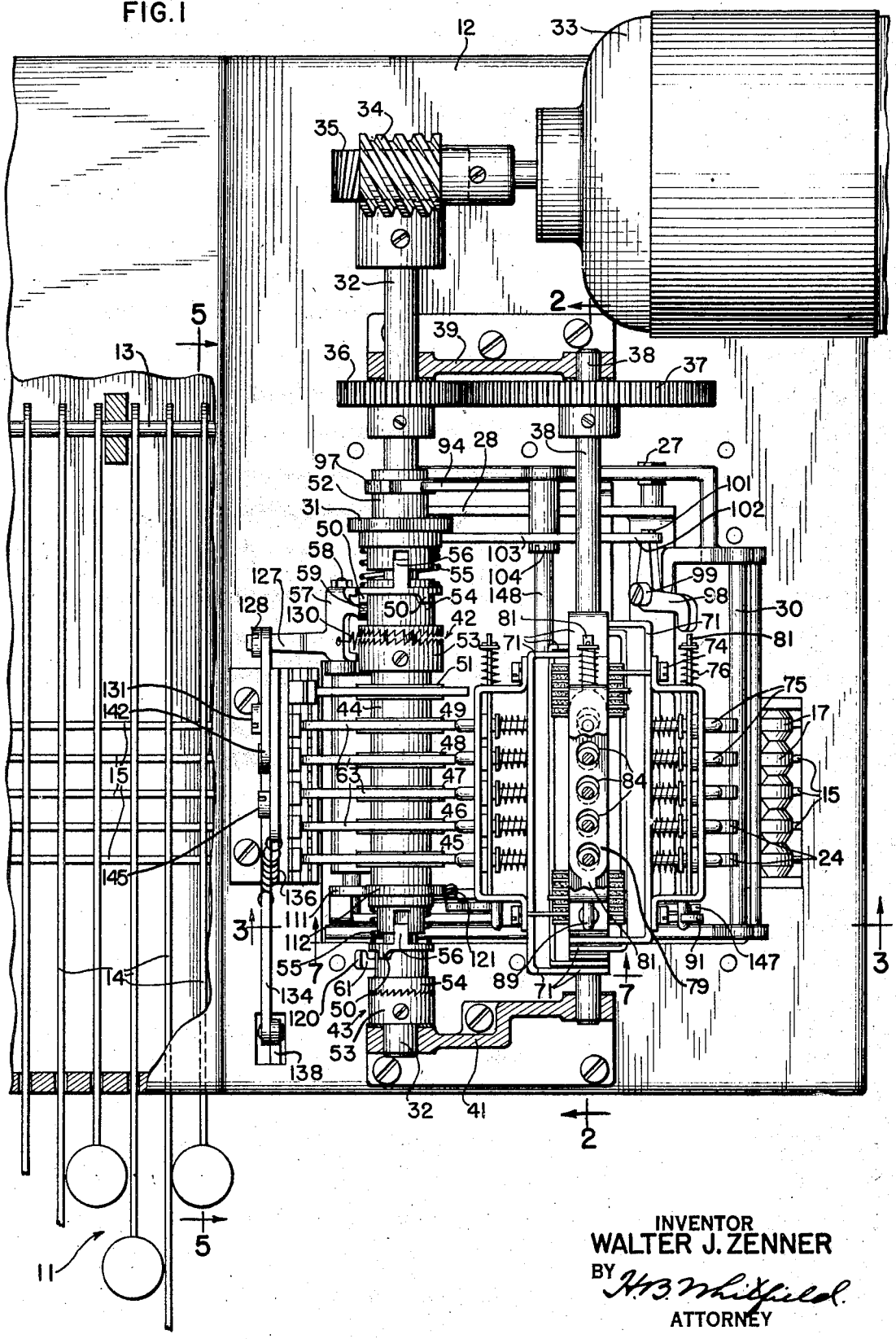

Referring now more particularly to the accompanying drawings, a group of key levers indicated generally by the reference character 11 is pivotally supported in a base casting 12 upon a transverse pivot rod 13. Transversely of and just below the main body portion of the individual key levers indicated 14 is a set of code bars 15 each bar of which is provided with a particular arrangement of saw tooth notches and projections 16 in a section thereof just below the general area traversed by the key levers 14. The notches and lugs 16 are distributed and arranged so that upon the depression of any of the key levers 14, the engagement of the lowermost edges thereof with divers ones of the inclined surfaces of the projections 16 causes certain of the code bars 15 to be shifted longitudinally. The distribution of notches and projections 16 is such that an individual disposition of the several code bars 15 is afforded in response to the depression of each key lever 14. In order to promote readily the free movement of the code bars 15 in response to the depression of any of the key levers 14, they are supported endwise between individual pairs of anti-friction rollers 17 mounted on shafts 18, Fig. 3.

At one end, each of the code bars 15 is provided with an articulation notch 19 into which there fits a disc 21 which terminates one arm of an associated latch lever 22 pivoted at 20, the other arm of which is shouldered as at 23 by reason of which it is enabled to latch an associated code setting lever 24, five of which (in the instant case) are pivoted on a common bail rod 25. By viewing Figs. 3, 4 and 6 it may be noted that bail rod 25 is carried between a pair of arms 26 which form part of a cradle assembly 10 (Fig. 6) pivoted upon trunnions 27. One arm 28 extending perpendicularly with respect to arms 26 carries a follower roller 29 which rides the periphery of a duplex cam 31 shown in its normal position in Fig. 3 and in an advanced position in Fig. 4. Cam 31 is integrally formed with a driven collar 52 carried upon shaft 32 to be referred to hereinafter as the distributor cam shaft (Fig. 1).

The code setting levers 24 are backed by a rod 30 against which each lever normally is held under the influence of an individual spring 40. When the bail rod 25 is rocked about axis 27 those code setting levers 24 whose associated latches 22 have been shifted counterclockwise, as illustrated by the rearmost one in Fig. 4, are permitted to continue to rest against rod 40, but the remaining levers 24 whose latches have been shifted to or are found in their clockwise position, as illustrated by the foremost lever 24 in Fig. 4, will maintain their relative position to bails 26 distending their springs 40 and receding from the rod 30.

Power for rotating shaft 32 is obtained from an electric motor 33 whose shaft carries a driving worm 34 which meshes with a driven gear 35 keyed to shaft 32. A driving pinion 36 also secured to shaft 32 communicates motion through driven gear 37 to a storage unit shaft 38. Shafts 32 and 38 are journaled within bossed portions of the end frames 39 and 41.

Referring again to the distributor cam shaft 32 it will be noted that in addition to a tooth clutch indicated 42, through which power is selectively communicated to cam 31 and its integral collar 52, another tooth clutch 43 is provided (Fig. 1) for communicating power from shaft 32 to a sleeve 44 upon which are mounted the several distributor cams 45, 46, 47, 48, 49, and 51 and a clutch lever resetting cam 112.

Figure 6:
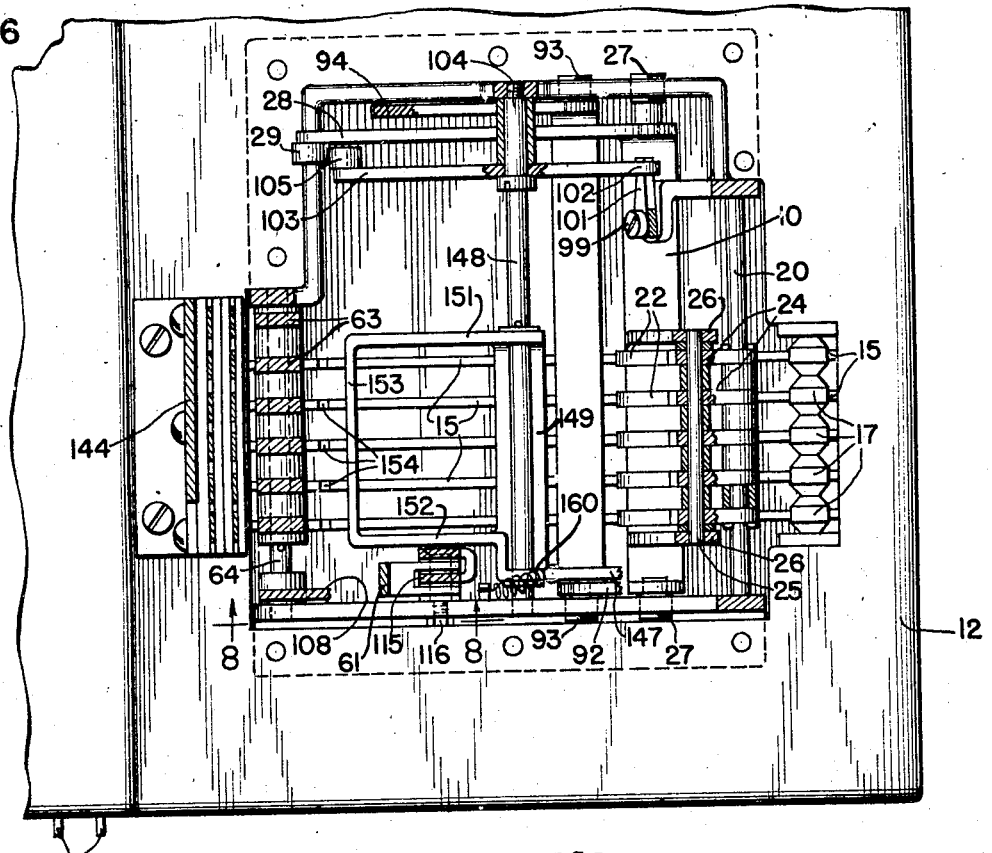
Fig. 6 is a sectional plan view taken approximately on line 6—6 of Fig. 3.

Clutches 42 and 43 are of similar construction and operation and each comprises essentially an anchored driving element 53 upon a lateral face of which there are provided radial serrations which mesh with similar serrations formed in a driven sleeve 54. The latter is urged by a spring 55 to engage the serrations of driving member 53, and when a union between the two members is effected, the power is further communicated through a sliding tenon connection 56 to the ultimate objective, which in the case of clutch 42 is the collar 52 and in the case of clutch 43 is the sleeve 44. It will be noted during the course of the following description that as an incident to the control means of clutch 42 its driving and driven members may become disassociated in either of two radial positions preferably at half-revolution intervals whereas clutch 43 is designed to be controlled in this manner only at one place in the course of its revolution. Thus it may be said that clutch 43 performs one revolution per cycle while clutch 42 perfoms but a half revolution per cycle. To effect disengagement between the driving and driven portions of the clutches, the driven sections 54 thereof are recessed and in a side wall adjoining the recess they are provided with laterally extending cam lugs 50 of which clutch 42 has two and clutch 43 but one. In the case of clutch 42 a release lever 57 (Fig. 5) pivoted at 58 carries a disc 59 which may be selectively presented into or withdrawn from the annular recess in member 54. When the disc 59 is presented within the recess of member 54, the latter may continue in rotation until one of the sidewardly extending lugs 50 encounters the surface of disc 59. When this occurs, member 54 is shifted longitudinally, compressing spring 55, telescoping the sliding tenon connection 56, and withdrawing the teeth of driven member 54 from those of the driving member 53. This permits the driving member 53 to rotate independently of the driven assembly. A similarly performing clutch control lever is also provided for clutch 43. In Figs. 1, 6 and 8 this lever is indicated by the reference character 61. Subsequently in the present description the controlling operation of clutch 43 will be described in greater detail. For the immediate purpose it will suffice to note that upon each engagement of the driving and driven element of clutch 43, sleeve 44 is rotated through a complete revolution.

As has been stated before, sleeve 44 carries a series of cams indicated 45 to 49 and 51. Each of the aforementioned cams is of the same shape and resembles the one illustrated in Fig. 4. The distribution of the several cams 45 to 49 and 51 on sleeve 44 however is such that the nadir or low portion 62 thereof is presented radially and progressively in advance of its adjacent cam so that the several nadirs 62 describe a helix about the sleeve 44. Cooperating with each cam 45 to 49 and 51 is a contact lever 63 pivoted on a common shaft 64 and possessed of a horizontally extending bar at the upper extremity thereof, one end 65 of which engages an insulated block 66 of an associated contact pair 67, and an opposite end 68 of which slopes downwardly to align with an associated storage pin 75 of a storage unit to be described hereinafter.

A projection 69 integrally formed with each lever 63 is gently spring-urged by the influence of one of the contact pairs 67 acting upon lever 63 against the periphery of its associated cam 45 to 49 or 51 so that when the cam is rotated (clockwise) as viewed in Fig. 4 and the nadir 62 comes into registration with the projection 69, lever 63 is permitted to rock clockwise about its pivot 64, permitting the contact pair 67 to close during a corresponding time interval, and permitting to be issued over an associated signaling line (not shown) an electrical impulse indicative of a signal condition and the position of lever 63. Thus as the several cams 45 to 49 and 51 proceed during each cycle of revolution, each of the levers 63 is given an opportunity to close the associated contact pair under the principal supervision of its respective cam. Not in each case, however, is a lever 63 permitted to respond to the clearance afforded by the nadir 62 of its associated cam, since this freedom of action is also determined under the supervision of each of the storage elements, as will be described later.

Referring now particularly to Figs. 1, 2, and 3, it will be noted that shaft 38, journaled at its extremities, carries a plurality of bails indicated 71. Each bail 71 is comprised of a longitudinal section and a pair of perpendicular ear sections terminating with an opening within which the shaft 38 is received. As assembled upon shaft 38, the several bails 71 are journaled in longitudinally nested alignment and between the adjacent ear sections there are provided spacer washers 72 so that each bail 71 may be free to rotate until it collides with its adjacent bail, as best indicated in Fig. 3. Upon the longitudinal section of each bail 71, there is superimposed a ledge bracket 73 to which it is secured by means of screws 74. Supported within aligned openings in ledge bracket 76 and bail 71 is a series of five storage pins 75. The outer extremity of each pin is semispherically rounded and its inner portion is reduced slightly in diameter. A spring 76 encircles each pin 75 and is compressed between the surface of bail 71 and a flange 77 integrally formed with the pin 75. This spring influence tends to present the several pins 75 in their outermost or distal positions as limited by the abutment against bracket 73 of collars 78 which are also integrally formed with each pin 75.

Traversing each ledge bracket 73 longitudinally is a lock bolt 79, the contour of which is best illustrated in Fig. 1. Each bolt 79 is provided with narrowed extremities 81 which pass through appropriate slots in the parallel portions of the brackets 73. The distance between the reduced sections 81 is somewhat less than that between the upstanding parallel portions of brackets 73, thereby permitting the bolts 79 to be moved a short distance longitudinally. Springs 82 tensioned between the outer surface of one of the upstanding sections of each bracket 73 and an end washer 83 keyed to its bolt 79 tends to maintain the bolt in its forward extremity as illustrated in Figs. 1 and 2. In registration with the series of pins 75 each bolt 79 is provided with a corresponding series of openings 84, Fig. 1, of sufficient proportions to pass the enlarged collars 78 when said openings 84 are in concentric alignment with the pins 75. To attain this alignment, the influence of springs 82 are overcome and bolts 79 shifted leftwardly, as viewed in Fig. 2. At other times when the influence of springs 82 prevails, bolts 79 are maintained in their rightward extremity whereas the openings 84 are eccentric of the pins 75, preventing the displacement of any of the storage pins from either of their alternative positions to the opposite one. By first aligning the openings 84; that is, moving bolts 79 leftwardly, the several pins 75 are free to be presented in any permutable disposition and thereafter by permitting bolts 79 to resume their spring-urged positions, pins 75 are locked in accordance with their settings.

It has been said above of bails 71 that they are free to revolve about shaft 38. Movement is imparted to bails 71, however, by the frictional driving means, best indicated in Figs. 2 and 4. Shaft 34 is preferably splined longitudinally and is provided with an alternately nested series comprising driving washers 85, friction discs 86, and driving arms 87. It will be noted that washers 85 are provided with keyway lugs securing them to the shaft 38 against angular displacement. Friction discs 86 and driving arms 87 are not thus provided with keyway lugs, so that the rotational power positively communicated to the driving discs 85 is frictionally communicated to the arms 87 through the medium of the friction discs 86. An expansible spring 88 coiled about shaft 38 and disposed between a foremost and rearmost group of said series of driving discs 85 and arms 87 urges the nested groups frictionally together so as to promote the proper frictional engagement between the washers 86 and their contiguous elements.

Though the several bails 71 are progressively offset from each other as a result of their overlying relationship, it will be noted that ledge brackets 73 are nevertheless in circumferential alignment with each other and also that the storage pins 75 supported thereby are also in circumferential alignment with the corresponding storage pins of each of the other storage assemblies comprising a bail 71 and a ledge bracket 73. For this reason the rotation of the several storage units brings each set of storage pins 75 into the same alignment previously occupied by its preceding set of storage pins. Shaft 38 and its several bails 71, including their appurtenances, are referred to as the storage unit. The function of this mechanism is to receive a signal setting under the control of the keyboard and to carry the setting over to a point wherefrom it is communicated to a line signal transmitting mechanism. It will be recalled that the several bails are continuously and frictionally urged due to the rotation of shaft 38 by means of the driving arms 87. In Figs. 3 and 4 two of the bails are illustrated respectively in the code setting and code transmitting positions indicated by the reference characters A and B respectively.

Figure 9:
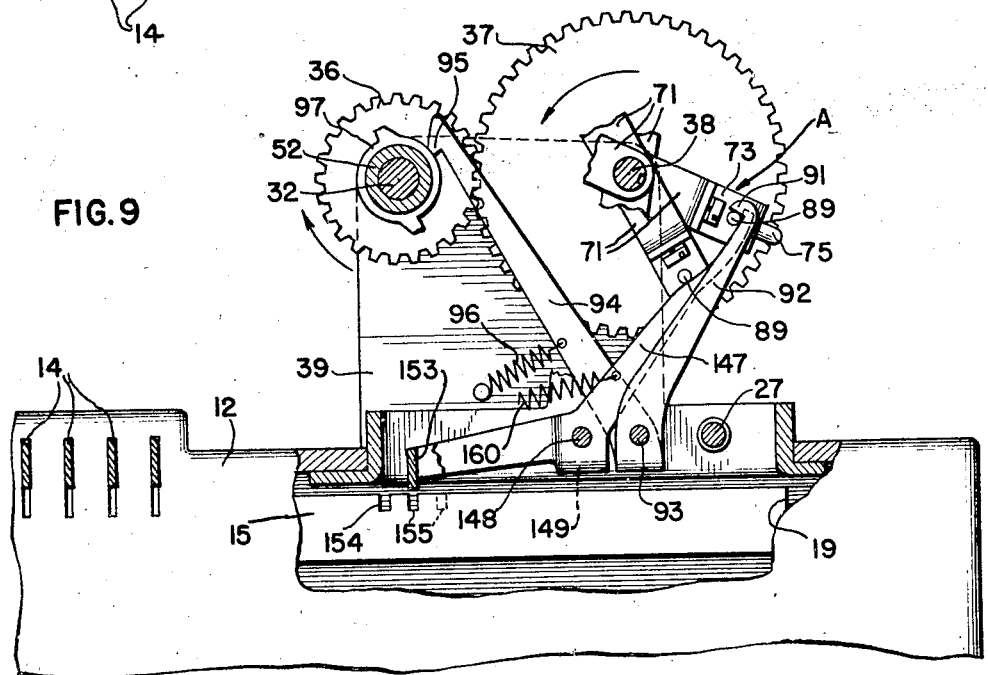
Fig. 9 is a fragmentary sectional view taken approximately on line 9—9 of Fig. 2.

In the position indicated A (Fig. 9) a bail 71 is restrained when its pin 89 encounters the tooth 91 of a bell crank arm 92 (Fig. 9). The bell crank is pivoted on trunnion screws 93 and its other arm 94 terminates with a cam follower projection 95. The bell crank 92—94 is urged by a spring 96 in a counterclockwise direction so that the projection 95 rests against the periphery of a duplex release cam 97 which (Fig. 1) is integrally associated with the collar 52. Accordingly the cyclic rotation of collar 52, as aforedescribed, carrying with it cam 97 perfects the release of each storage bail 71 from its position A, permitting the latter to revolve counterclockwise, as viewed in Figs. 3 and 9, until it arrives at a position indicated B (Fig. 4) or failing to do this because other bails 71 are in its path, until it encounters a bail 71 next preceding it in the cluster assembled behind position B.

While in its code setting position A, a storage bail 71 is presented so that its lock bolt 79 and particularly the foremost extension 81 thereof aligns with one arm 98 of a bell crank pivoted at 99 whose other arm 101 (Figs. 1, 2 and 3) is articulated to one end 102 of a release lever 103 pivotally supported at 104. The controlled extremity of lever 103 carries a follower roller 105, seen in Figs. 3 and 4, and presented against the periphery of duplex cam 31 in advance of the roller 29 associated with arm 28 of the code setting bail aforedescribed. Accordingly each apex of duplex cam 31 encountering roller 105 before roller 29 causes the shifting of a lock bolt 79 during an instant interval preceding the transfer movement of levers 24. In this way a previous setting is released due to the fact that the openings 84 of lock bolts 79 are brought into concentric alignment with the collars 78, permitting springs 76 to thrust outwardly any of the pins 75 which had been depressed by a previous setting. Before the apex of cam 31 passes completely over the roller 105, its encounter with roller 29 effects the actuation of transfer levers 24, pursuant to a new setting so that when a lock bolt 79 is ultimately and fully released under the control of cam 31, there is consummated a restoration to normal of all of its depressed pins 75, and immediately following this, there is instituted a new code setting in accordance with an ensuing signal. It may be observed from Figs. 4 and 9 that cams 31 and 97 are of the duplex type and also it will be recalled that clutch 42 is capable of being arrested at two radially opposite positions. As a consequence it is noted that these cams, which are carried by collar 52, are able to perform their complete functions during the course of but a half-revolution of travel, executing two functions to each complete revolution, the time required for the distributor apparatus of shaft 32 to perform but one complete function. This permits the storing of signals by the manipulation of the keyboard and the resulting setting in the storage elements 71—73 to be carried on at a comparatively high rate of speed undiminished by the prevailing rate of speed at which transmission of telegraph signals is initiated.

As has been said, following the release of a bail 71 from its A position, shaft 38 becomes effective to propel it until it collides with an accumulation of bails 71 waiting behind the B position or if none such bail happens to be so waiting, until it encounters with its pin 89 the lug 106 of bow arm 107 of a V-lever 108 (Fig. 7) pivoted at 64 whose other arm 111 rests against the periphery of a cam 112 carried by the sleeve 44. When a signal is electrically transmitted and sleeve 44 has consummated one revolution about shaft 32, the signal stored in a bail 71 which had been assuming the position B is thereby executed. Accordingly the apex of cam 112 acting upon arm 111 of V-lever 108 rocks said lever about its pivot 64 and against the tendency of a spring 113 withdraws the projection 106 from the path of the particular pin 89. This frees the bail 71 which may then collect behind any accumulation of bails back of the position A as indicated in Fig. 3.

In addition to serving as a release means for V-lever 108, cam 112 also serves in a further utility as best revealed in Fig. 8. Here a bail 71 indicated in position B is engaging an extreme portion of a projection 114 relating to a trip lever 115. The latter is pivoted at 116 and is urged by a spring 117 in a clockwise direction. Pivoted at 118 in the body of the lever 115 is a trip dog 119 influenced in a clockwise direction by a spring 121 connecting it with a lug 122 of lever 115. Trip dog 119 is formed with a projection 123 which extends into the path of the apex of cam 112 and a shoulder 124 which engages a sidewardly extending lug 125 integrally formed with lever 61. A spring 126 pulls lever 61 clockwise urging its disc shaped extremity 120 (Fig. 1) to be presented within the annular recess of driven member 54 associated with the transmitter release clutch 43. When the several elements are disposed as indicated in full lines in Fig. 8, lever 61 is withheld because its projection 125 encounters the shoulder 124 of trip dog 119. The revolving apex of cam 112 thereafter encounters the projection 123, rocking trip dog 119 about its pivot 118 until shoulder 124 is moved clear of the lug 125 and rendering lever 61 free to respond to the influence of its spring 126 whereupon its uppermost extremity which terminates in the disc portion 120 is presented within the annular recess of member 54 of clutch 43. As an effect of the intervention of portion 120 of lever 61, the driven element 54 of clutch 43 is cammed away, causing to be arrested the distributor sleeve 44 and its several appurtenances.

Meanwhile, cam 112 engages the V-lever 108, releasing the B position bail 71—73, causing its pin 89 to pass over the projection 114, and permitting lever 115 to be drawn clockwise by its spring 117. When lever 115 moves clockwise carrying with it trip dog 119, the shoulder 124 is moved back, permitting it to slip behind projection 125, trip dog 119 being urged continuously by its spring 121 in a clockwise direction about pivot 118. Thereafter when a succeeding bail 71 assumes position B its pin 89 encountering the projection 114 rocks lever 115 counterclockwise, which in turn pushes trip dog 119, dislodging lever 61 from the recess in member 54 of clutch 43 and placing it again in the position as indicated in full lines in Fig. 6. If none of the bails 71 are in readiness to be moved into the position B, that is, if for example, the keyboard is not continuously operated, the failure to release bails 71 from their position A would ultimately cause them all to become accumulated back of the position A. As a result trip lever 115 would continue to remain in its clockwise position leaving clutch release lever 61 within the recess of clutch 43 and holding the transmitting cam sleeve 44 in abeyance. Noteworthy in the aforedescribed sequence of operations is the fact that storage bails 71 are released from position B under the control of the transmitting cam sleeve 44 whose cycle of operation is coincident with the transmission of each signal received from a preceding storage bail 71.

The effect that the several pins have upon the transmission of a particular signal has already been described in connection with the operation of the set of contact levers 63. Accordingly the signal which has been stored in a bail 71 found in position B is forthwith communicated to the contact levers 63 controlling the latter in their manner of operation; that is to say, determining whether levers 63 may or may not be permitted to rock clockwise, Figs. 3 and 4, as their associated nadirs 62, which occur in successive sequence, are presented opposite their projections 69.

It has been said above that collar 52 carrying cams 31 and 97 is driven under the supervision of clutch 42. The release of clutch 42 is executed by a clutch cam lever 57 acting in a manner similar to the foredescribed clutch cam lever 61 which is associated with the first described clutch 43. In the case of lever 57, however (Figs. 1 and 5), a horizontally extending arm 127 thereof is adapted to be engaged by an eccentrically adjustable screw head 128 carried at the extremity of one arm of a trigger 129 which is pivoted at 131 and influenced in a clockwise direction, Fig. 3, by a return spring 130. Another arm of trigger 129 terminates with an angular tooth formation 132 whose receding edge inclines to cooperate during the return movement with a corresponding surface on a projection 133 formed in a foremost extremity of a floating bar 134 pivoted at 135 and urged upwardly by a spring 136.

Pivotally articulated at 135 to bar 134 is an ear 138 which is secured to a cross member 137 of a universal bail having transverse arms 139 pivoted at pivot screws 141, only one of which is visible in Fig. 5. Trigger 129 is limited in its clockwise rotation when an abutment 142 formed therewith engages a stop screw 143 carried in an end wall 144 see also Figs. 4 and 5. The free end of floating bar 134 is confined during its horizontal movement by a pair of shoulder screws 145 and 146. Moreover bar 134 widens at the region indicated 140 to provide a cam inclination which cooperates with screw shoulder 145 so as to thrust bar 134 downwardly as it is moved leftwardly by the ear 138 of universal bail 137. As a result of this movement of bar 134 projection 133 after actuating trigger 129 by engaging its tooth 132 slips off promptly permitting trigger 129 to be restored under the influence of bell crank 57 which is responsive to its spring 130. Upon the depression of any key lever 14 it strikes the transverse portion 137 of bail 139 causing the latter to be rocked about pivots 141 and in so doing pivotal center 135 is moved rightwardly as viewed in Fig. 5. This causes bar 134 to be floated rightwardly and downwardly until the projection 133 engaging the tooth formation 132 of lever 129 causes the latter to be rotated in a counterclockwise direction. When this occurs, the eccentrically headed screw 128 depresses the horizontal arm 127, rocking the clutch trip lever 57 out of engagement with the driven element 54 of clutch 42.

In this manner, the depression of any keylever 14 releases clutch 42, causing the driving and driven portions 53 and 54 thereof to couple together and cause collar 52 to rotate through one-half revolution. As a result of this release, cam 31 causes to be installed a new code signal in the bail 71 found in the position A, and immediately thereafter cam 97 releases the position A bail, permitting it to be driven towards the transmitting position, B.

Referring now to Figs. 1, 6 and 9, attention is directed to a trailing arm 147 which forms part of a bail structure pivoted on a transverse shaft 148. Integrally formed with arm 147 is a transversely extending portion 149, see also Fig. 4, with which connect a pair of side arms 151 and 152. A locking blade 153 joins the side arms 151 and 152 and is disposed transversely of the code bars 15, each of which is provided with a pair of notches 154 and 155 alternatively presentable beneath the locking blade 153. Each code bar 15, being capable of assuming two positions longitudinally and having a pair of notches 154 and 155 alternatively in alignment beneath blade 153, it will be understood that bail 153 being influenced by a spring 160 is at all times receivable within a transverse alignment of notches in whatever disposition the several code bars 15 may assume in response to any code signal. This movement on the part of locking blade 153 is restrained, however, by reason of the interference with the counterclockwise movement of trailing arm 147 of the pins 89, so that when no storage bails 71 are found in the position A, or in transit approaching position A, there may result a movement of the locking blade 153 into the aforedescribed transverse alignment of notches. Since, then, the movement of blade 153 is contingent upon an absence of storage elements 71 in the proximity of the position A and in the positions immediately preceding the position A, it will be observed that the several code bars 15 will be locked against longitudinal displacement when all of the unused storage elements 71 have been exhausted. That is to say, when the keyboard operator has overtaken the transmitting speed to an extent that all of the storage elements 71 are awaiting signal transmission the further manipulation of the keyboard is positively prevented since the depression of any key thereafter may require the longitudinal repositioning of one or more of the code bars 15.

*Operation*

The manner of operating the present device is as follows. It will be understood, of course, that the contact pairs 67 are arranged in parallel in a signalling line in accordance with a conventional practice such as is well known in the art of printing telegraphy. A keyboard operator depresses the keylevers 14 in accordance with the letter, figure space, or special function signals which comprise a message. Upon the depression of each keylever 14, the several code bars 15 are shifted rightwardly or leftwardly, as the case may be, causing the several latch levers 22 to be disposed in a corresponding manner, viz., those code bars 15 which are moved leftwardly will position their associated latch levers 22 as indicated by the foremost lever in Fig. 4, while the remaining ones will position their latch levers 22 as indicated by the hinder levers 22.

Concurrently with the depression of any keylever 14, there is effected the reciprocation of universal bail 137 which, because of its articulation at 135 to floating bar 134, trips the trigger lever 129, withdrawing release lever 57 and causing the driving and driven portions of clutch 42 to be brought into engagement with each other for the duration of a half-revolution, it being recalled that the angular tooth formation 132 and projection 133 are designed to release promptly after engagement so that the disc 59 of release lever 57 is free to immediately resume its position within the annular recess of driven member 54 of clutch 42.

As a result of the rotation of clutch 42 through a half-cycle of revolution, its two duplex cams 31 and 97 are enabled to execute their respective functions, cam 31 actuating release lever 103 which shifts the lock bolt 79, found in the position A, to the unlock position, and oscillates bell crank 26, 28, causing to be transferred and stored a signal in accordance with the setting of latch levers 22 as imparted to the transfer levers 24, depressing corresponding ones of the storage pins 75 now found in position A. Immediately following the installation or storage of a code signal, the effective apex of cam 31 will have passed beyond roller 105 of arm 103 so that the particular lock bolt 79 may at once resume its effective position with regard to the new code setting. Near the end of its cycle, the apex of cam 97 engages projection 95 of bell crank 92—94, causing to be withdrawn the tooth 91 of arm 92 from the path of pin 89 of lock bail 71 found in position A. Tooth 91 is immediately restored, however, as soon as the apex passes projection 95 and is effective in detaining the succeeding bail 71 when it arrives in the position A.

The release of storage bails 71 from position A permits them to be driven by their respective arms 87 through the friction discs and washers 85 thereafter until they are arrested momentarily in the position B. Following this they are again free to be driven about shaft 38 until finally brought to rest at or in advance of the position A. The arrest of a storage bail 71 in position B is effected when its pin 89 collides with the lug 106 of V-lever arm 107. If it is to be assumed that distributor sleeve 44 has meanwhile been held in abeyance awaiting an introductory bail 71, the arrival of pin 89 opposite projection 114 cams away lever 115, which through trip dog 119, pushes clutch release lever 61 out of its effective position. As a result, the driving and driven elements of clutch 43 are permitted to come into engagement, releasing the distributor sleeve 44 and its several integrally associated cams which thereupon describe a complete revolution during which the nadir 62 of each cam 45—49 and 51 is brought into alignment with a projection 69 of an associated contact lever 63. Of the levers 63, those, whose ends 68 encounter pins 75 in a depressed condition, are permitted to rock clockwise as their projections 69 seek to follow the periphery of their associated cam into the nadirs 62, but the remaining contact levers 63 are withheld from doing so because of the intervention of their associated storage pins 75. In accordance with the movements of the several contact levers 63 their associated contact pairs 67 which are normally maintained ajar as indicated in Fig. 3, are momentarily permitted to close, causing to be issued so-called marking or current impulses over the transmission line.

Near the conclusion of its cycle, cam 112 which is carried by sleeve 44, actuates arm 111 of V-lever 108, withdrawing lug 106 but permitting it instantly to return so as to be in readiness for a succeeding pin 89 to be arrested in position B. Noteworthy in the foregoing described operations is the fact that the keyboard control mechanism is independently initiated and is moreover, more rapidly operable than is the transmitting mechanism and its associated controls. This feature permits of a keyboard operating speed considerably in excess of the line signalling speed. When in accordance with manipulation of the keyboard 11 at an accelerated speed over that of the transmitting mechanism all of the storage bails 71 have been charged or impressed with signals to be transmitted and are all found beyond position A and no farther than position B, the available supply of storage elements 71 will momentarily be exhausted. In order to apprise an operator of this fact, locking blade 153 acting through trailing arm 147 functions to lock the several code bars 15 in accordance with the last signal to be transmitted. When thereafter one of the keylevers 14 is sought to be depressed, the manipulation will be resisted by an inability on the part of certain one or ones of the code bars 15 to be shifted. This condition of immobility will suffice to apprise the operator that the storage mechanism has been exhausted.

While the distributor shaft comprising sleeve 44 and its assembly of cams 45 to 49 rotates cyclically describing a complete revolution during the transmission of each signal, the keyboard control collar 52 which carries the duplex cams 31 and 97 is describing but a half revolution for the consummate control of signal storing mechanism. This renders the keylevers 14 free to receive a new setting at about the time that the transmitter sleeve 44 is completing but half its cycle, resulting in a condition where the keyboard operator may exceed the rate of transmission by one hundred percent. The accumulated excess is manifest by a storage of signals in the pins 75 of storage bails 71. In accordance with the specific embodiment a limited acceleration may be accommodated which will suffice to utilize characteristic bursts of speed which many operators experience while transmitting short and familiar words. Where the principles taught herein are sought to be applied to transmission systems upon a larger scale, a greater number of storage bails or equivalents may be provided.

It will be understood, of course, that the proportioning and design of divers features of the present invention may be so modified as to permit of various adaptations within the contemplation of the present invention. Accordingly it is not intended that the present invention be limited to any of the details illustrated in the accompanying drawings or as described in the foregoing specification, except as indicated by the hereinafter appended claims.

What is claimed is:

1. A keyboard mechanism comprising a set of key levers, a set of code bars permutably shiftable under the manipulation of said key levers, an apparatus comprising a plurality of signal storage members, each member having a number of settable storage pins, means under the control of said set of code bars for imparting a corresponding setting to said settable storage pins of each of said signal storage members progressively comprising a set of transfer elements each individual to one of said code bars and a set of transfer element latches conditionable by an associated code bar to control the operation of a related one of said set of transfer elements, driving means for advancing said storage units to a line transmitting position, and a set of signalling contacts controlled by each of said storage members successively for issuing telegraph signals corresponding to a setting.

2. A keyboard transmitting mechanism, including a transmitting shaft having a plurality of cams arranged in a spiral progression, a corresponding set of transmitting contacts, a set of contact control levers, each associated with one of said cams and contacts, a plurality of manual control key levers, a set of permutation elements positionable in accordance with the operation of said key levers, storage apparatus for receiving signals from said permutation elements and communicating them to said transmitting levers comprising a plurality of bail elements pivotally supported about a common axis, a driving means for urging said bail elements about said axis, stop means under the control of said transmitting shaft for arresting said bail elements in the proximity of said contact control levers, and stop means under the control of said plurality of key levers for arresting said bail elements in the proximity of said permutation elements.

3. A metallic storage device comprising a plurality of bail elements supported for rotation about a common axis, frictional means concentric of said axis for moving said elements, stop means carried by each of said elements, a member for arresting said elements in a code setting position, and a member for arresting said elements in a code transmitting position.

4. A mechanical storage apparatus for permutation code signals comprising a plurality of concentrically revolvable storage members, each member having a set of storage pins corresponding in number to the number of signal impulses constituting a permutation code signal, a continuously rotatable shaft centrally disposed of said storage elements, driving arms carried by said shaft each articulated with one of said elements, discs keyed to said shaft, and friction means for imparting power from said discs to said arms and thereby to said storage members, projections carried by each of said elements, a stop for arresting a foremost one of a group of said elements in a code setting position, and a transmitting stop for arresting a foremost one of a group of said elements in a code transmitting position.

5. In a keyboard storage transmitting mechanism, a plurality of manual key levers, a set of permutation code bars permutably positionable by said key levers, a signal transmitting mechanism, a storage apparatus under the supervision of said code bars for initiating signals in association with said transmitting mechanism, said storage apparatus comprising a plurality of revolvable bails, means for arresting said bails in the proximity of said code bars, means for arresting said bails in the proximity of said transmitting mechanism, and means under the control of a bail in the proximity of said code bars including a locking bail movable into the path of said code bars for arresting the longitudinal movements thereof.

6. A mechanical storage apparatus comprising a plurality of bails pivotally supported on a common axis, a set of longitudinally shiftable pins in each of said bails, spring means individual to said pins for urging them in a common direction, projections on said pins, a lock bolt having spaced openings to align with said pins, means whereby said bolt is shiftable longitudinally to present said openings opposite said pins, spring means for deflecting said bolts normally to render said openings out of alignment with said pins, and means including keyboard control mechanism for depressing said bolts momentarily to permit shifting of said pins and for setting said pins.

7. The invention set forth in claim 6, including a transmitting shaft, distributor contacts associated with said shaft, means under the control of said pins for effecting the closure of said distributor contacts correspondingly, and means carried by said transmitting shaft for releasing said bails after each signal transmission.

8. In a keyboard mechanism, a plurality of key levers, a set of code bars having inclined notch and lug surfaces engaged by said keylevers for permutably shifting said code bars thereby, each code bar being shiftable to two alternative positions and having a pair of lock bail notches alternatively registerable in a transverse alignment, a lock bail, spring means for urging said bail into said transverse alignment of notches, a signal storage mechanism controlled cyclically by the disposition of said code bars comprising a plurality of units each having a number of settable elements, and means conditioned by said units for withholding said bail from said notches.

9. A metallic storage device comprising a plurality of bail members supported for independent orbital movement, a set of storage pins in said bail members longitudinally shiftable into alternative positions, each storage pin including an associated spring element urging said pin constantly in one direction, a collar element serving as a stop means in determining the longitudinal movement of each pin, a lock member common to each set of storage pins having openings to pass said collar elements, and spring means for normally maintaining said lock member out of alignment for blocking the free passage of said collar elements.

10. A metallic storage device comprising an arrangement of bail elements, a continuously rotatable shaft disposed centrally of said bail elements, frictional driving connection between said shaft and each of said bail elements, a set of storage pins carried by each of said elements, positive locking means for maintaining a signal storage setting of said set of pins throughout the cyclic rotation of said elements, and means for releasing said locking means momentarily to permit the resetting of said sets of pins.

11. The combination set forth in claim 10 in which said storage pins comprise concentric collar portions and said locking means comprises a longitudinally shiftable lock bar having openings transversely thereof and shiftable into one position for passing said collar portions and into another position for positively blocking said collar portions against movement.

12. In a metal storage transmitting device, a cluster arrangement of storage elements each comprising a bail member, said several bail members journaled in longitudinally nested alignment, a common driving shaft supporting said several bail members, and frictional drive means connecting said shaft and each of said bail members individually, each bail member having associated with it a set of storage pins arranged in a transverse alignment, a set of storage setting levers, a reciprocable bail rack for supporting said levers, a lock member for holding said storage pins in either of alternative storage conditions, and cam controlled means cyclically operative for first releasing said lock member and then actuating said bail rack and setting levers.

13. In a mechanical storage device, a continuously rotatable shaft, a plurality of bails journaled on said shaft in progressive longitudinal alignment for cyclic revolution, a plurality of driving arms associating said shaft with each of said bars individually, frictional driving means connecting said shaft and said driving arms, a set of storage pins carried by each of said bails, said set of said bails being radially in alignment, keyboard control mechanism for imparting a setting to said storage pins in one cyclic position, and signal transmitting means conditioned in accordance with said storage pins in another cyclic position.

14. The combination set forth in claim 13 including longitudinally shiftable lock bars associated with said bails for positively detenting movement of said pins during transit, and power driven means for cyclically releasing said lock bars.

15. A signal storage magazine comprising a series of pins corresponding to signal elements, spring means for urging said pins in one direction, a pair of supports having journal openings in alignment for supporting said pins for free longitudinal movement, a bar having openings spaced in accordance with said pins and movable longitudinally so as to bring said openings alternatively into concentric registration and into eccentric displacement with respect to said pins, and projections carried by said pins to be retained on one side or the other of said bar during the latter's eccentric displacement.

16. A keyboard transmitter comprising a rotatable shaft, a transmitting mechanism, a code setting mechanism, means actuated by said shaft once during a complete revolution thereof for operating said transmitting mechanism, and means actuated by said shaft a plurality of times during a complete revolution thereof for operating said code setting mechanism.

17. A keyboard transmitting device comprising a continuously rotatable power shaft, a member rotated by said shaft having secured thereto a series of transmitting cams, a plurality of units having settable code storage means for supervising the effectiveness of said transmitting cams, keylever controlled means presentable into permutable arrangements, transfer mechanism for communicating a setting from said keylever controlled means to said settable storage means, a clutch for communicating power from said shaft to said member, a clutch for communicating power from said shaft to said transfer member, declutching means for said member effective once during each cycle of revolution of said shaft, and declutching means for said transfer mechanism effective a plurality of times during each revolution of said shaft.

18. In a keyboard transmitting mechanism, a set of manually operable keylevers, a set of permutation code bars positionable in accordance with the actuation of said keylevers, a signal transmitting shaft, a plurality of elements each having a set of storage pins, intermediate means independently movable between said bars and said elements for setting said storage pins in accordance with the permutable disposition of said permutation code bars, and means controlled by said storage pins and said transmitting shaft including a set of electrical contactors for issuing telegraphic line signals, said setting means being operative a plurality of times during the period in which said transmitting means is operated but once.

19. A signal transmitter comprising a cluster of individually rotatable storage units, means for issuing line signals in accordance with a setting of said storage units, a cam assembly for clearing said storage units and for communicating a new setting thereto, a power train, and a multiple clutch connecting said power train with said cam assembly for actuating said cam assembly a plurality of times during the period said signal issuing means is actuated once.

20. A storage transmitter comprising signal transmitting means, storage setting means, and a power shaft for actuating both of said means including a single revolution clutch connecting said power shaft with said signal transmitting means and a partial revolution clutch connecting said power shaft with said storage setting means.

21. A metallic storage device comprising a plurality of elements supported for movement continuously in the same direction in an orbit, a plurality of driving means each associated with one of said elements for revolving it in said orbit, means for arresting said elements in a code setting position, and means for arresting said elements in a code transmitting position.

22. A metal storage transmitting device comprising a plurality of members each having signal storage means, a support for said members to permit their free orbital movement in one direction, transmitter controlling means located at one point in the orbit of said members, arresting means under the control of said transmitter, means for stopping said members thereat and for releasing them after the transmission of a signal, a code setting means, and an arresting device under the control of said code setting means effective to stop said members at another point in said orbit and for releasing them following the communication of a storage setting thereto.

23. In a metal storage apparatus, a plurality of members each having settable storage means, a driving source, and a frictional driving connection between said source and each of said members individually.

24. A storage device comprising a plurality of elements, means for supporting said elements for movement in a circuitous path, storage setting means carried by each of said elements, a common driving source, and individual driving connection between said source and each of said elements.

25. A storage device comprising a plurality of elements arranged in a file and separable each from its contiguous one, means for supporting said elements for movement in an orbit, storage setting means carried by each of said elements, a common driving source, and individual driving connection between said source and each of said elements.

26. In a storage device, a plurality of individually circulating storage members, a set of conditionable pins carried by each of said members, means for locking said pins in a set condition, and means for withdrawing said pin locking means in the proximity of a storage setting position.

27. In a storage transmitter, a plurality of members having attributes conditionable to designate individual combinations of a code system, means for supporting said members throughout an orbital path of movement, and means for driving said members individually in a continuous rotary direction.

28. In a storage transmitter, a plurality of storage members each having a set of elements which are individually settable to correspond with the components of a permutation code, means for supporting said members individually through an orbital path, a common driving source, and individual frictional driving connection between said source and each of said members to promote the movement of said members along said orbital path individually.

29. In a storage transmitter, a plurality of members having settable means to designate any combination of a predetermined code system, means for supporting said plurality of members in a consecutive arrangement throughout an orbital path, and means for advancing each of said members independently of its adjacent ones.

30. A metal storage transmitter in which a plurality of sets of conditionable signal elements are moved in a circuitous path during which they encounter a signal setting locus and a signal transmitting locus having in combination individual locking means associated with each of said sets of signal elements, means for maintaining said locking means effective to prevent the movement of said signal elements during the major portion of said path, and means effective only in said setting locus for disabling said locking means.

31. In a storage transmitter, a plurality of storage units each having a set of permutably conditionable elements, and means for revolving said units individually in a continuous direction.

32. In a metal storage transmitter, a plurality of signal storage units, supporting means for said units for confining them rotationally in a continuous path, and means for moving each of said units in its said path individually.

33. In a metal storage transmitter, a plurality of storage units pivotally mounted upon a common axis, a storage setting mechanism situated at a given point with respect to said axis, a transmitting apparatus situated at another given point with respect to said axis, and means to marshal said units behind each of said given points after they have passed a previous one of said given points.

WALTER J. ZENNER.